US012697563B2

(12) United States Patent

Tleimat

(10) Patent No.: US 12,697,563 B2

(45) Date of Patent: Aug. 4, 2026

(54) ROTATING EVAPORATOR DEVICE FOR LIQUID DISTILLATION OR CONCENTRATION

(71) Applicant: WATER REUSE TECHNOLOGY, INC., Garden Valley, CA (US)

(72) Inventor: Maher Chris Tleimat, Garden Valley, CA (US)

(73) Assignee: Water Reuse Technology, Inc., Garden Valley, CA (US)

( * ) Notice: Subject to any disclaimer, the term of this patent is extended or adjusted under 35 U.S.C. 154(b) by 219 days.

(21) Appl. No.: 18/603,431

(22) Filed: Mar. 13, 2024

(65) Prior Publication Data

US 2024/0325942 A1 Oct. 3, 2024

Related U.S. Application Data

(60) Provisional application No. 63/455,884, filed on Mar. 30, 2023.

(51) Int. Cl.
| | |
|---|---|
| *B01D 1/22* | (2006.01) |
| *B01D 1/26* | (2006.01) |

(Continued)

(52) U.S. Cl.
CPC .............. *B01D 1/225* (2013.01); *B01D 1/26* (2013.01); *B01D 5/009* (2013.01); *C02F 1/043* (2013.01); *C02F 1/048* (2013.01); *C02F 1/08* (2013.01)

(58) Field of Classification Search
CPC .............. B01D 1/222–225; B01D 1/26; B01D 3/08–085; B01D 3/146; C02F 1/043; C02F 1/048; C02F 1/08
See application file for complete search history.

(56) References Cited

U.S. PATENT DOCUMENTS 3,695,327 A * 10/1972 Widmer .............. B01J 19/1887
159/49
3,764,483 A 10/1973 Tleimat (Continued)

OTHER PUBLICATIONS

ISR-WO—International Search Report and Written Opinion of International Searching Authority for International Patent Application No. PCT/US2024/019645, mailed Jul. 18, 2024, 9 pages.

(Continued)

*Primary Examiner* — Renee Robinson
(74) *Attorney, Agent, or Firm* — THE MARBURY LAW GROUP PLLC

(57) ABSTRACT

A rotating evaporator includes a chamber, and a rotor assembly disposed in the chamber, and including distillation elements that each contain an internal cavity, condensation surfaces that face the internal cavity, and evaporation surfaces that face away from the internal cavity, and a vapor manifold extending through the distillation elements and configured to provide a vapor to the internal cavities. The evaporator also includes wiper assemblies configured to form a liquid film on the evaporation surfaces, condensate scoops located in the respective inner cavities of the distillation elements and configured to collect a condensate from the condensation surfaces, a condensate manifold extending through the vapor manifold and configured to receive the condensate from the condensate scoops, and a drive assembly configured to rotate the rotor assembly and including a drive shaft and drive rollers disposed on the drive shaft and contacting outer circumferential contact surfaces of the distillation elements.

19 Claims, 10 Drawing Sheets

(51) Int. Cl.
　　*B01D 5/00*　　　　(2006.01)
　　*C02F 1/04*　　　　(2023.01)
　　*C02F 1/08*　　　　(2023.01)

(56)　　　　　　References Cited

U.S. PATENT DOCUMENTS

| | | | |
|---|---|---|---|
| 4,225,538 | A | 9/1980 | Shafranovsky et al. |
| 4,482,432 | A * | 11/1984 | Caffes .................... C02F 1/048 |
| | | | 202/205 |
| 4,504,361 | A | 3/1985 | Tkac et al. |
| 4,586,985 | A | 5/1986 | Ciocca et al. |
| 5,409,576 | A | 4/1995 | Tleimat |
| 7,143,818 | B2 | 12/2006 | Thayer et al. |
| 2015/0157953 | A1 * | 6/2015 | Duesel, Jr. ........... B01D 1/0082 |
| | | | 55/423 |
| 2015/0360972 | A1 * | 12/2015 | Reuveni ................... B01D 1/30 |
| | | | 202/241 |
| 2020/0399143 | A1 * | 12/2020 | Bitterly ................... B01D 1/28 |

OTHER PUBLICATIONS

IPRP-WO—Notification Concerning Transmittal of International Preliminary Report on Patentability and Written Opinion of the International Searching Authority for International Patent Application No. PCT/US2024/019645, mailed Sep. 20, 2025, 5 pages.

* cited by examiner

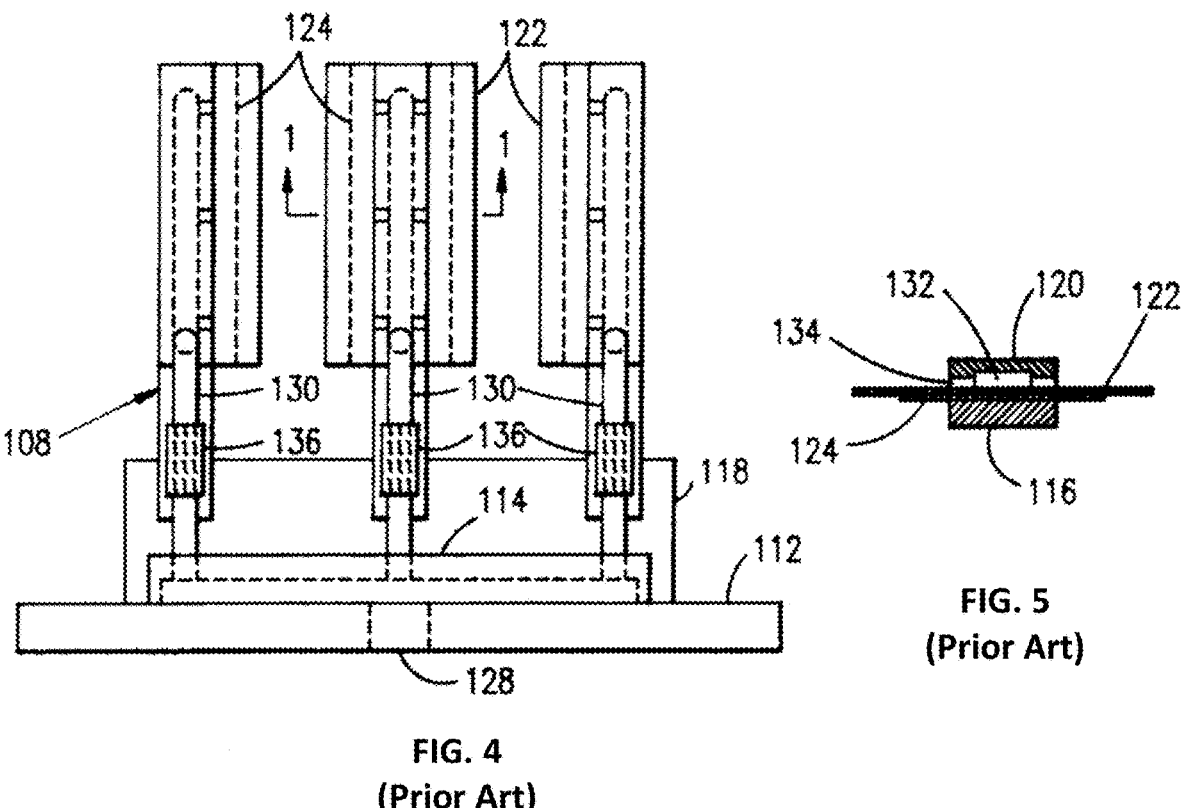
FIG. 4
(Prior Art)
FIG. 5
(Prior Art)
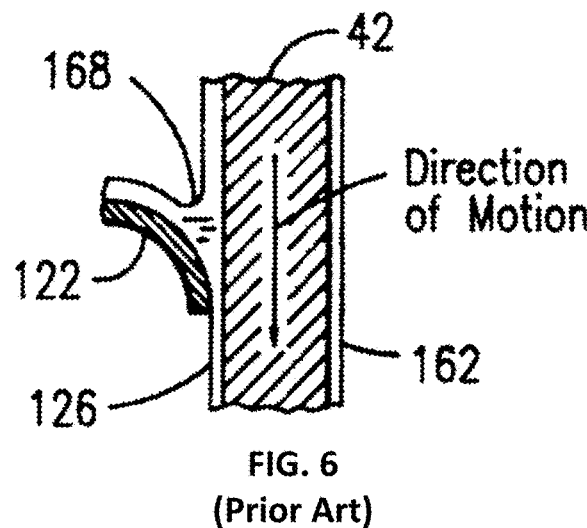
Direction of Motion
FIG. 6
(Prior Art)

Evaporator Disk
732

50    50    50

740A

Contactor
740

Drive
Assembly
710

712
Drive Shaft

714
Drive Roller

716
Spacer

714A

Idler Roller
718

44

736

Vapor Vane
760

Distillation Element
735

R

20
Chamber

750

734

732

760

Drive Roller
714

Idler Roller
718

Lifting Tool
800

802

Hooks
804

Hook
804

750

ROTATING EVAPORATOR DEVICE FOR LIQUID DISTILLATION OR CONCENTRATION

FIELD

Aspects of the present disclosure relate generally to impaired water desalination, and in particular, to rotating disk condensing evaporators for distillation processes.

BACKGROUND

A rotating disk evaporator apparatus operates by evaporating a liquid on one side of a heat transfer disk using heat transferred from the opposite side of the disk by vapor condensation. The temperature difference between the two sides of the disk causes heat to flow from condenser side to evaporator side. The disk may be rotated and wiped to form a thin liquid film, which may comprise a distilland film, in order to increase the overall heat transfer coefficient.

SUMMARY

According to various embodiments, a rotating evaporator includes a chamber, and a rotor assembly disposed in the chamber, and including distillation elements that each contain an internal cavity, condensation surfaces that face the internal cavity, and evaporation surfaces that face away from the internal cavity, and a vapor manifold extending through the distillation elements and configured to provide a vapor to the internal cavities. The evaporator also includes wiper assemblies configured to form a uniform and thin liquid film on the evaporation surfaces, condensate scoops located in the respective inner cavities of the distillation elements and configured to collect a condensate from the condensation surfaces, a condensate manifold extending through the vapor manifold and configured to receive the condensate from the condensate scoops, and a drive assembly configured to rotate the rotor assembly and including a drive shaft and drive rollers disposed on the drive shaft and contacting outer circumferential contact surfaces of the distillation elements.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 4 is a schematic representation of a prior art wiper assembly of FIG. 3.

FIG. 5 is a schematic cross section taken along line 1-1 of FIG. 4.

FIG. 6 is a schematic view of wiper, disk, feed pool, and feed and condensate films of the prior art rotating evaporator.

DETAILED DESCRIPTION

Figure 1:
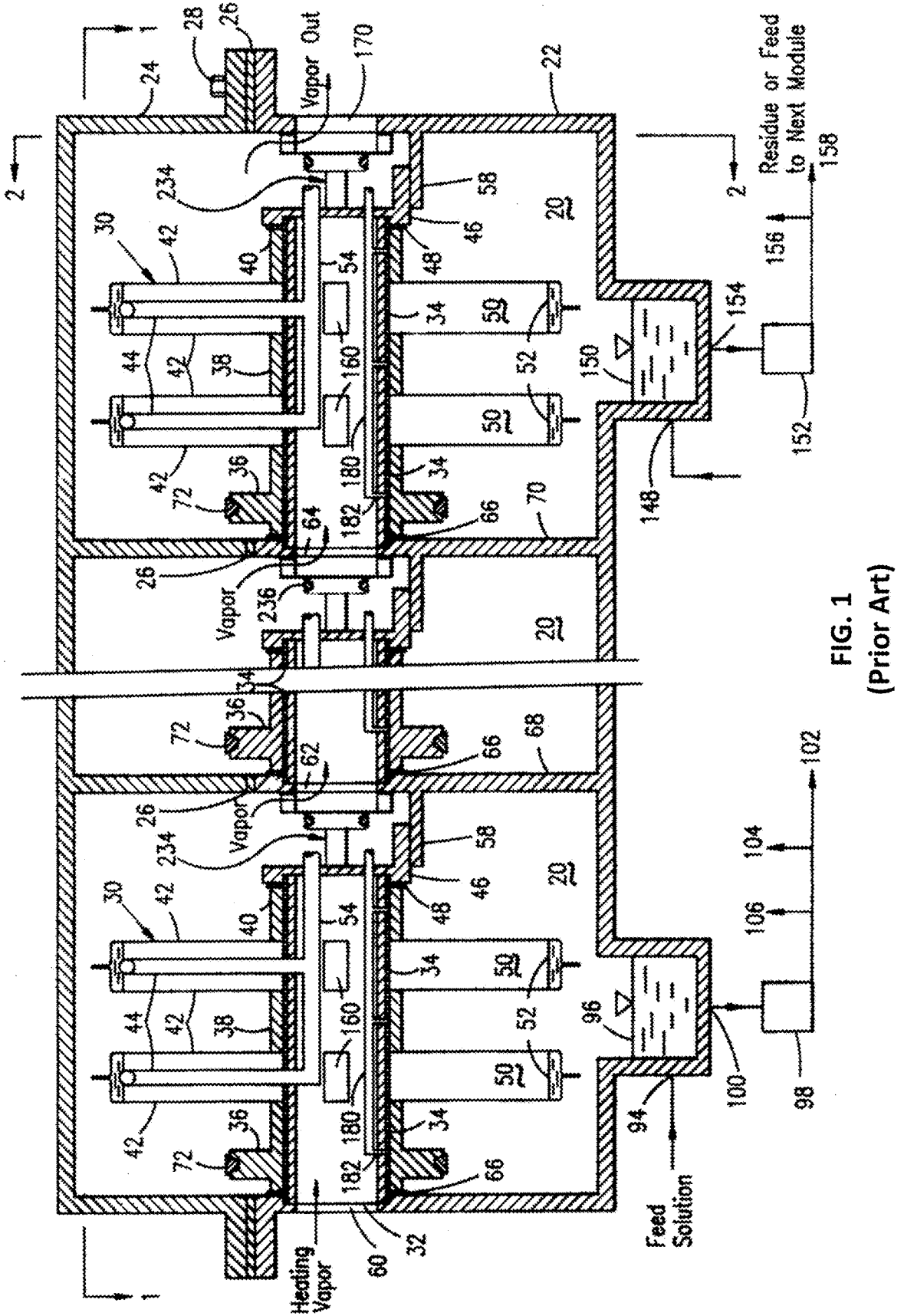
FIG. 1 is a schematic cross-sectional view of a prior art rotating evaporator.

The present disclosure is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The embodiments of the present disclosure provide multiplicity of rotating disk pairs in each effect with several effects housed in one enclosure to form one module. Each disk pair forms a cavity within which the heating vapor condenses on the inside surfaces of the disks and the feed evaporates from a thin film wiped on the outside surfaces of the disks. The modules can be arranged in series for thermally driven multi-effect distillation systems or be used singly in multi-effect vapor compression distillation.

In thermally driven multi-effect distillation the feed solution and heating vapor from external sources enter the first effect of the first module. The condensate from the first effect of the first module is returned to the external source. The residue from the last effect of the first module is used as the feed to the second module and the vapor generated in the last effect of the first module is used as the heating vapor in the second module. This process is repeated in several modules. In the last module the residue from the last effect forms the final residue and the vapor generated in the last effect is condensed in a final condenser. The condensate streams from the second effect of the first module through all the other effects of the system together with the condensate stream from the final condenser are collected as distillate.

In multi-effect vapor compression distillation, two to several effects, the vapor generated in the last effect of the module is compressed to raise its saturation pressure and temperature and is then used as the heating vapor in the first effect. Because of the gradual increase of dissolved solid concentration in the solution as compared to single effect, this arrangement reduces the energy input to the compressor per unit of product and greatly reduces the physical size of the compressor. This occurs because the volumetric capacity required by the compressor is inversely proportional to the number of effects.

A typical embodiment of a prior art multi-effect (e.g., multi-chamber) rotating evaporator module is illustrated in FIGS. 1 through 6. It comprises of a tight enclosure defining separate chambers 20. The enclosure includes a housing 22 and cover 24 secured together with a gasket 26 and bolts 28. Within each chamber 20 one or more rotor assemblies 30 are installed. Each rotor 30 includes a horizontal stationary hollow rotor shaft 32, a pulley coupling 36, intermediate couplings 38, an end coupling 40, preformed evaporator disks 42, distillate scoops 44, a bracket 46 with suitable bearing material 48 attached to bracket 46 which is fastened to shaft 32. In this assembly a bearing insert 34 is attached either to the outside surface of shaft 32 or to the inside surfaces of each of the couplings 36, 38 and 40. In this assembly one disk 42 is attached to pulley coupling 36, one pair of disks 42 is attached to each intermediate coupling 38, and one disk 42 is attached to end coupling 40. The disks 42 are fastened to each other at the outside flanges to form cavities 50 where one stationary scoop 44 per cavity 50 is fastened to shaft 32. The scoops 44, where the condensate is withdrawn from pool 52 communicate with condensate manifold 54 which protrudes through bracket 46 and is suitably attached to tube 56 (see FIGS. 2 and 3).

Each rotor assembly 30 is supported on one side by fastening bracket 46 to shelf 58 and on the other side by partially inserting the end of shaft 32 into vapor inlets 60, 62, and 64 where the end of each coupling 36 butts against bearings 66 which are attached to one end of housing 22 and to separating plates 68 and 70. The rotor assemblies 30 in chambers 20 are rotated by couplings 36 through belts 72 and pulleys 74 which are suitably attached to shafts 76, 78, and 80 (see FIG. 3). Shafts 76, 78, 80, and 82 are connected to one another by flexible couplings 84 with drive shaft 82 protruding from housing 22 through suitable seal 86 and bearings 88. The shafts 76, 78, and 80 rotate inside bearing inserts 90 bonded to brackets 92 which, in turn, are fastened to housing 22 and separating plates 68 and 70.

In operation, the feed solution enters the first effect at 94 and mixes with the liquid in pool 96 (see FIG. 1). This mixture is withdrawn from pool 96 by pump 98 at 100. The stream from pump 98 is split into three streams 102, 104, and 106. Stream 102 is used as feed to the second effect while stream 104 is circulated back to the first effect through wiper assembly 108. Stream 106 enters the housing 22 at 110 and is used as lubricant for the bearing inserts 90. The wiper assembly 108 (see FIGS. 4 and 5) consists of a plate 112, a feed manifold 114 fastened to plate 112, bottom wiper holders 116 fastened to shelf 118, top wiper holders 120, flexible wipers 122 with suitable springs 124 underneath wiper 122 to push wiper 122 toward disk 42 so that a very thin liquid film 126 is applied on disk 42 (see FIG. 6). Both wiper 122 and spring 124 are clamped between lower and upper holders 116 and 120. Here, stream 104 enters the wiper assembly 108 at 128, through plate 112, and into feed manifold 114 where it is distributed through hoses 136 and tubes 130 into channels 132 and out of slots 134 into pool 168 (see FIG. 6). The feed is then wiped as a very thin liquid film 126 onto the outside surfaces of rotating disks 42.

Stream 102 from the first effect enters the second effect and mixes with the liquid pool at the bottom of the second effect. This process is repeated in a similar manner in the other effects except the last effect where the stream from the previous effect enters the last effect at 148 and mixes with the liquid in pool 150. The mixture 150 is withdrawn by pump 152 at 154 and is then split into two streams 156 and 158. Stream 156 is circulated back into the last effect through another wiper assembly 108 in a similar manner to that occurring in the other effects while stream 158 is used as the feed solution to another module or discarded as residue.

The heating vapor from an external source (see FIG. 1) enters the first effect at inlet 60 into shaft 32. The vapor then enters the cavities 50 through slots 160 in shaft 32 where it condenses as a thin film 162 on the inside surfaces of rotating disks 42 (FIG. 6). Due to centrifugal force the condensate in each cavity 50 is thrown to the periphery to form rotating condensate pools 52 from which the condensate is withdrawn by stationary scoops 44 into internal condensate manifold 54. The condensate then passes through bracket 46 into tube 56, out of module at 164, and into external condensate manifold 166. The manifold 166 is located below point 164 so that a liquid seal is provided between the effects to prevent inter-effect vapor leakage. The heat released by the condensing vapor is conducted through film 162, disk 42, and film 126 (see FIG. 6). Here, the latent heat of condensation causes the evaporation of an equivalent amount of feed from film 126 (FIG. 6) making it thinner prior to being replenished to its original thickness from feed pool 168. The heating vapor generated in the first effect is used as the heating vapor for the second effect where the vapor enters a rotary demister assembly 234 and then enters the second effect at inlet-outlet 62 to repeat the process occurring in the first effect. The vapor generated in the second effect is used as the heating vapor in the third effect and so on to the last effect. The vapor from the last effect is taken out through a demister 234 and out of the module at 170 to be used as the heating vapor to another module or to be condensed in a final condenser, or delivered to the compressor suction in a vapor compression distillation configuration.

The lubricant for the rotors consists of condensate stream 172 that enters housing 22 at 174 into manifold 176 where it is distributed to each rotor through tubes 178, which are connected to bracket 46. The stream then goes into manifold 180 where it enters orifices 182 in shaft 32 to supply lubricant to bearings 34 and thrust bearings 48 and 66.

Figure 2:
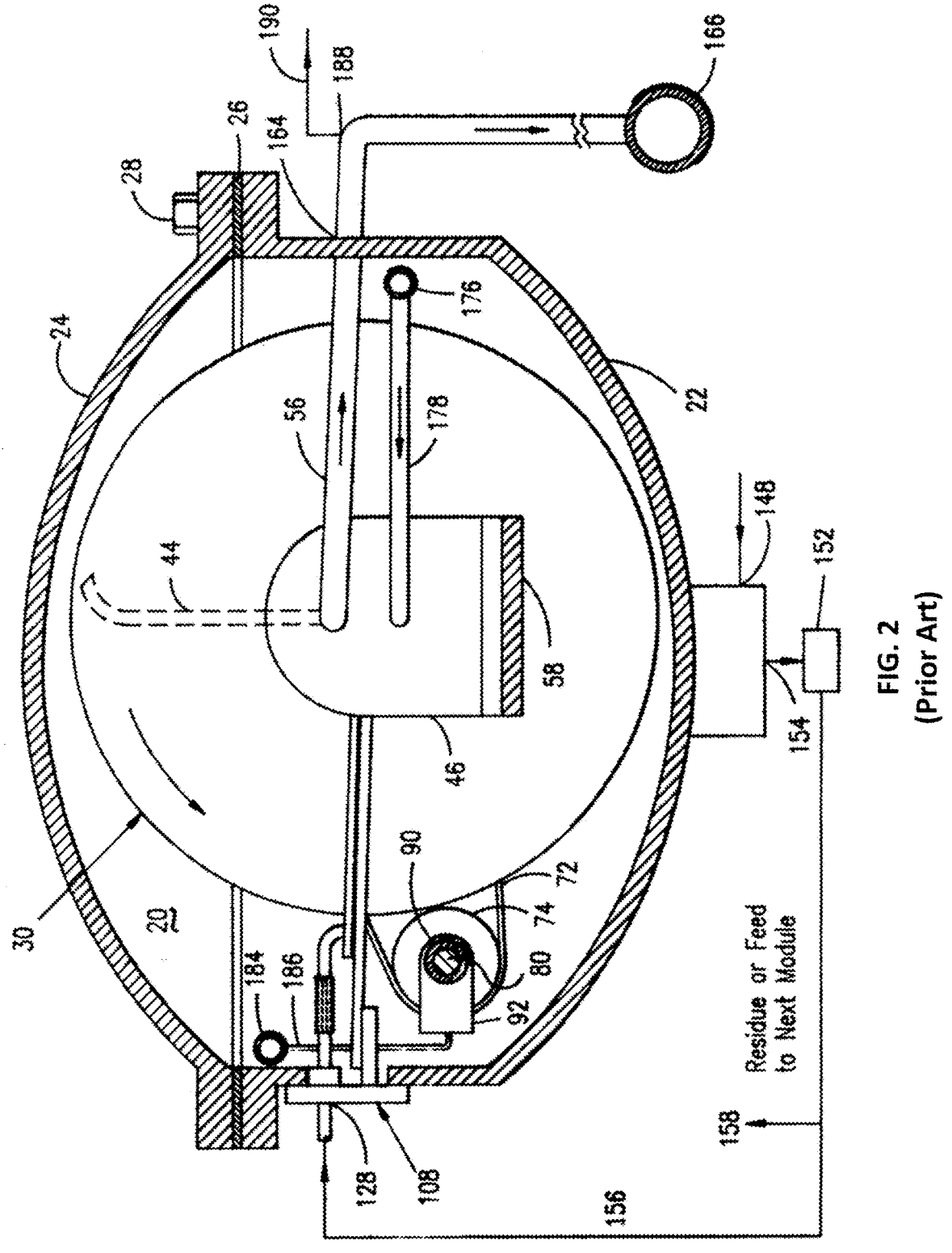
FIG. 2 is a schematic cross-sectional view taken along line 1-1 of FIG. 1.
Figure 3:
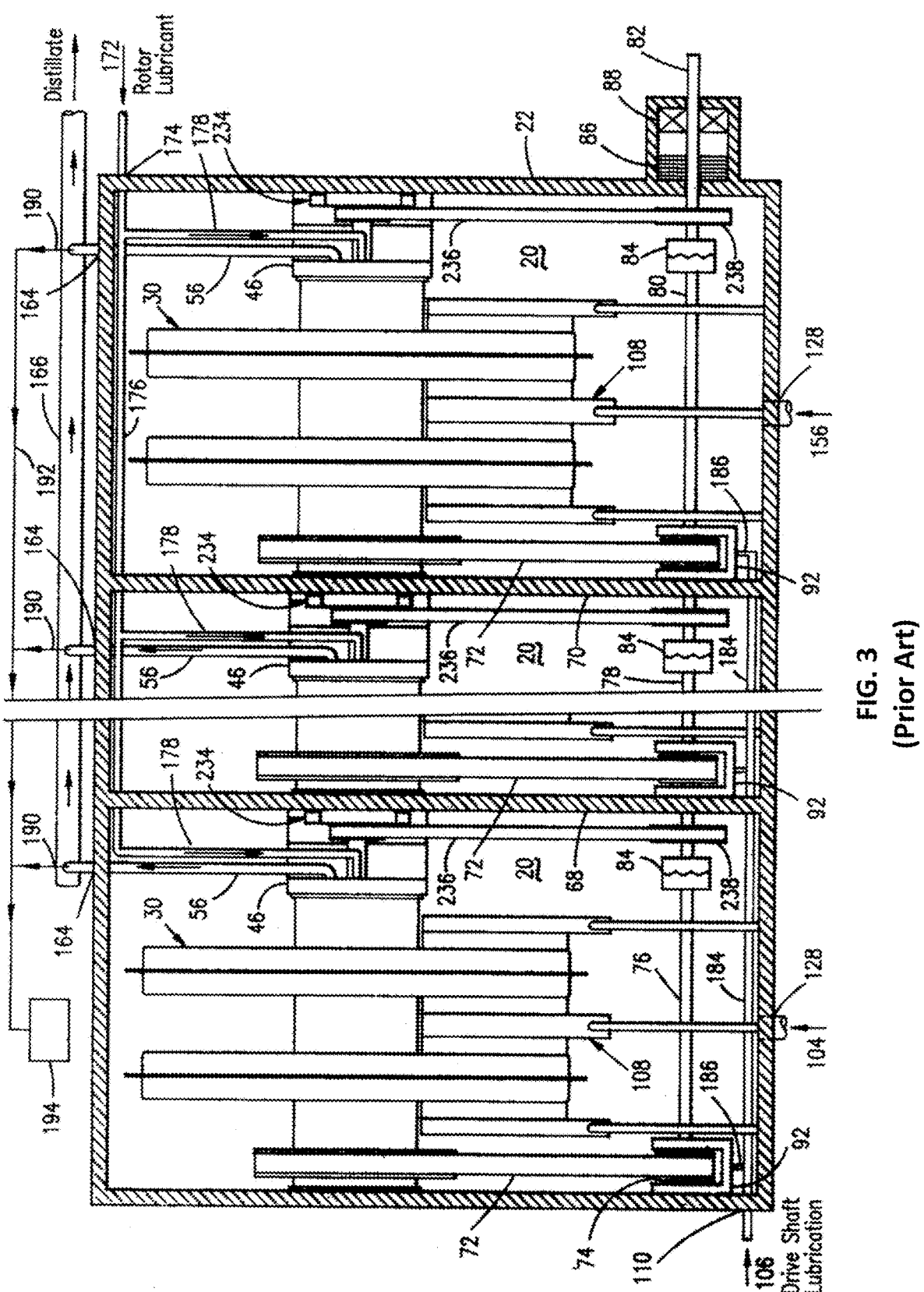
FIG. 3 is another schematic cross-sectional view of the prior art rotating evaporator of FIG. 1.

Referring to FIGS. 2 and 3, the bearing inserts 90 are lubricated by stream 106. This stream enters housing 22 at 110 into manifold 184 where it enters brackets 92 through tubes 186 and then through internal passages that communicate between tube 186 and the space between inserts 90 and drive shafts 76, 78, and 80.

The non-condensable gases are withdrawn from each of the effects at 188 into tubes 190, into vacuum manifold 192, and into a vacuum pump 194. In order to pack large heat transfer area in the module, several rotors can be installed in each effect.

Accordingly, the prior art disk evaporator includes a stationary hollow shaft that includes slots or holes and three manifolds. A rotor including evaporator disks is mounted on the shaft by couplings. A drive coupling (e.g., a timing belt and pulley) is used to transmit rotating power to the rotor. The couplings all include bearing inserts to facilitate rotation. Inner and outer disk clamps are used to secure disks to each other and/or to the coupling. The evaporator also includes distillate (product) scoop tubes, vent tubes, and lubrication ports.

Saturated vapor enters the inside of the shaft and flows through the slots or holes in the shaft, into spaces between disk pairs. As the vapor contacts the cooler disk, condensation occurs, and the formed droplets are flung, due to centrifugal force, to the outer periphery of the disk cavity. As the pool of condensate forms, it is picked up by the stationary scoop tubes, and transmitted to the distillate manifold. The distillate manifold is connected to the rotor manifolds adapter and distillate is subsequently removed from the evaporator housing. Distilled water is used as lubricant in the annulus between the rotor shaft and the couplings. Some distilled water flows along the inside diameter of the rotor shaft, and then flows back into the previous effect evaporator. A small piece of sheet metal (placed between the end of the shaft and the rotor vapor end bracket) is used as a dam to minimize the loss of distillate.

The rotor is driven by the timing belt which connects the drive pulley to the rotor drive coupling. In this configuration, the entire rotating load must be transmitted from the drive coupling to the connected disk, to the outer disk periphery, to the next disk, and so on. Stationary wipers with feed manifolds are mounted on the housing and extend radially inward toward the rotor coupling.

The present inventor realized that prior art disk evaporator devices included rotors that are complex and expensive to manufacture. The relatively heavy rotors also require a significant amount of energy to rotate. As such, there is a need for improved disk evaporator devices.

Embodiment Evaporator

Figure 7A:
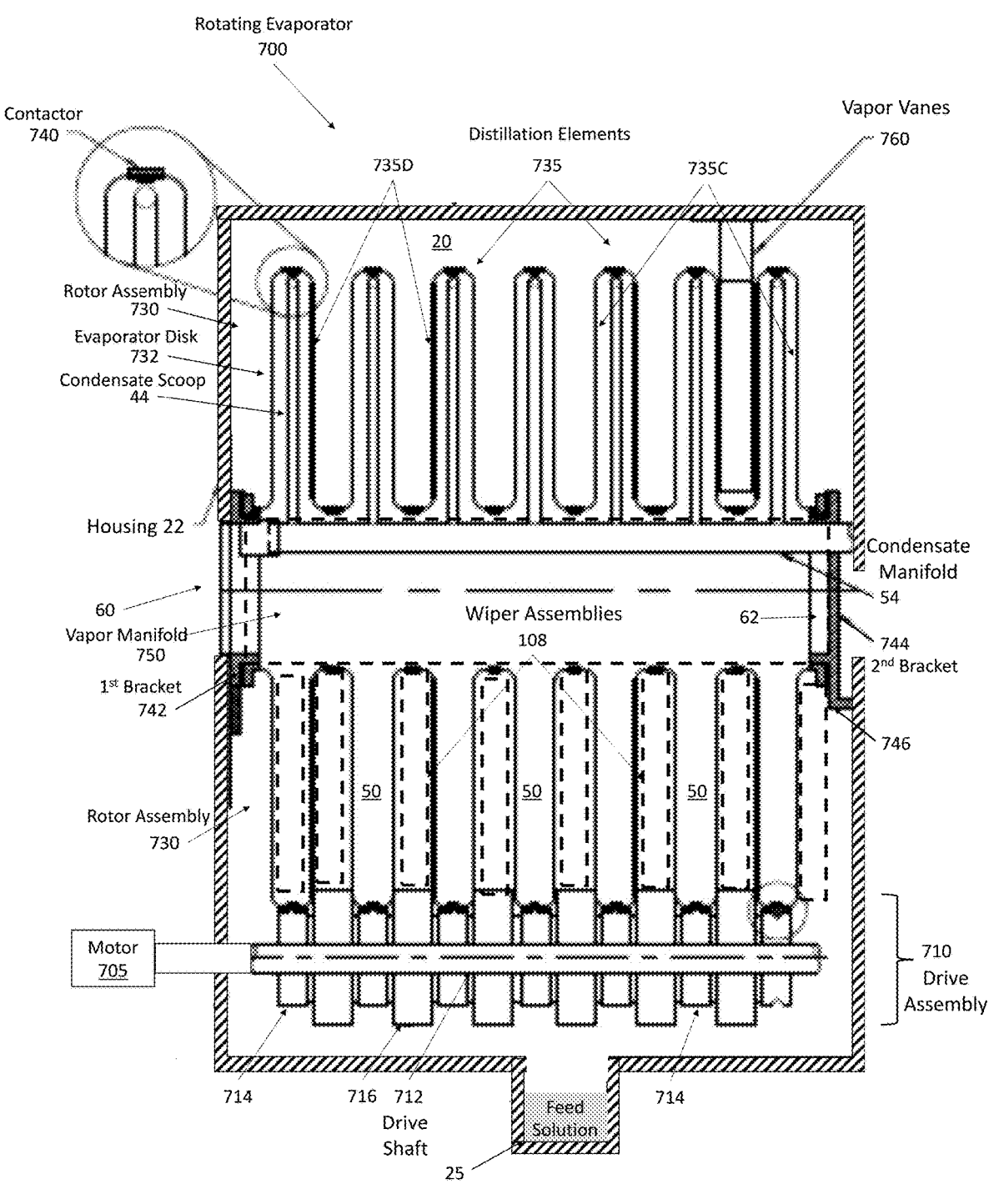
FIG. 7A is a is a schematic cross-sectional view of a portion of a rotating evaporator 700, according to various embodiments of the present disclosure.
Figure 7B:
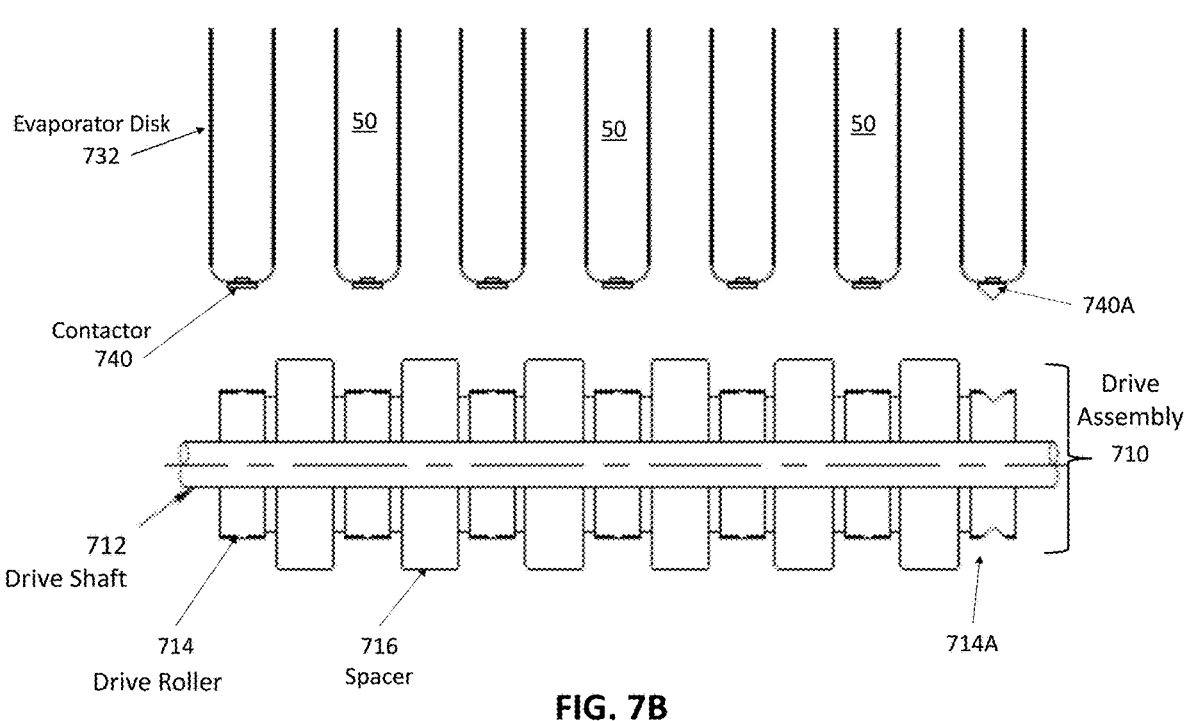
FIG. 7B is an exploded view showing a rotor assembly 730 and drive assembly 710 of the embodiment rotating evaporator of FIG. 7A.
Figure 7C:
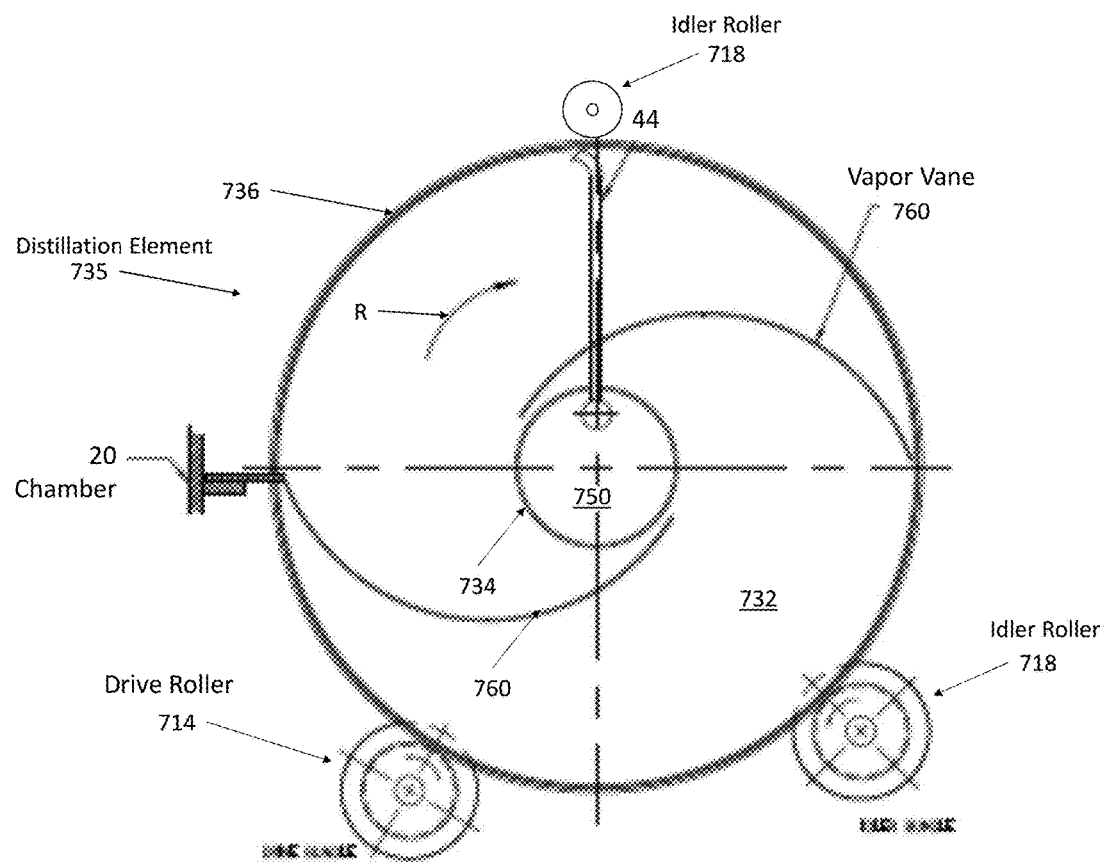
FIG. 7C is a plan view showing the outer surface (e.g., evaporator side) of an evaporator disk 732 of the embodiment rotating evaporator of FIG. 7A.
Figure 7D:
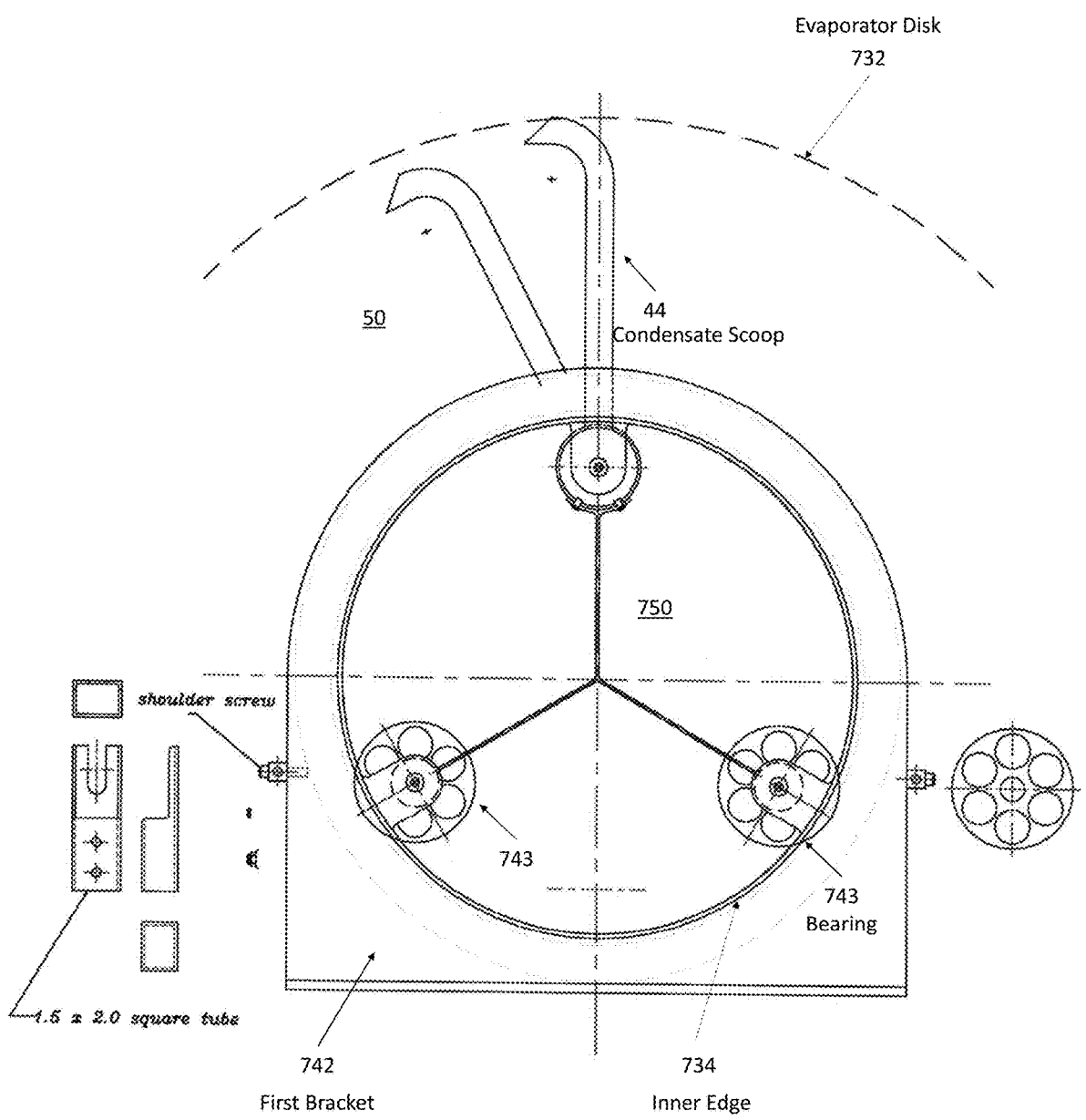
FIG. 7D is a partial plan view showing a first bracket 742 of the embodiment rotating evaporator of FIG. 7A.

FIG. 7A is a schematic cross-sectional view of a portion of an improved rotating evaporator 700, according to various embodiments of the present disclosure. FIG. 7B is an exploded view showing a rotor assembly 730 and drive assembly 710 of FIG. 7A, FIG. 7C is a plan view showing the outer surface (e.g., evaporator side) of an evaporator disk 732 of FIG. 7A, and FIG. 7D is a partial plan view showing a first bracket 742 of FIG. 7A. The evaporator 700 may be similar to the evaporator shown in FIGS. 1-6. As such, only the differences therebetween will be discussed in detail.

Referring to FIGS. 7A-7D, the drive assembly 710, rotor assembly 730, and wiper assemblies 108 may be disposed in a chamber 20 of a housing 22 of the evaporator 700. The chamber 20 may include a reservoir 25 containing a feed solution that is introduced as a liquid into the chamber 20. The rotor assembly 730 may include evaporator disks 732, condensate scoops 44, and a condensate manifold 54 as discussed above. The evaporator disks 732 may be annular. As shown in FIG. 7C, outer circumferential edges 736 of adjacent pairs of disks 732 may be connected to form distillation elements 735. The distillation elements 735 may include internal condensation surfaces 735C disposed on opposing sides of an internal cavity 50 of each distillation element 735, and external evaporation surfaces 735D that face the wiper assemblies 108.

As shown in FIG. 7C, inner circumferential edges 734 of the evaporator disks 732 of adjacent distillation elements 735 may be connected to connect the distillation elements 735 to each other and form of the rotor assembly 730. In particular, the connected inner circumferential edges 734 may form a vapor manifold 750 through which the condensate manifold 54 extends. The vapor manifold 750 may include openings (e.g., openings 160 shown in FIG. 1) through which the heating vapor enters the cavities 50 in the distillation elements 735. The scoops 44 may be disposed in the internal cavity 50 of each distillation element 735, as shown in FIG. 7D. The scoops 44 may be configured to collect a condensate (i.e., the condensed heating vapor) from the cavities 50 and provide the condensate to the condensate manifold 54.

In some embodiments, the inner circumferential edge 734 and the outer circumferential edge 736 of each disk 732 may be cupped or flanged in opposing directions to facilitate connection of the disks 732 to form the distillation elements 735 and the vapor manifold 750. In some embodiments, the disks 732 may be directly welded together or may be connected by use of a contactor 740. The contactors 740 may be a polymeric or metal material or extrusion that is rolled and/or machined to mate with the inner edges 734 and/or outer edges 736 of adjacent disks 732. For example, the contactors 740 may be circular elements having a circumference that approximately matches the outer circumference of the disks 732, or that matches an inner circumference of the disks 732. The contactors 740 may be attached to the disks 732 using, for example, a silicone sealant, an epoxy adhesive, brazing, or a combination thereof.

Each rotor assembly 730 may be supported by partially inserting a first end of the rotor assembly 730 into a first bracket 742. The first bracket 742 may be disposed adjacent to a first vapor inlet 60 of the chamber 20 and may include bearings 743, as shown in FIG. 7D. A second end of the rotor assembly 730 may be attached to a second bracket 744 that is supported by shelf 746 disposed adjacent to a second vapor inlet-outlet 62 of the chamber 20. A low friction material may be disposed between the shelf 746 and the second bracket 744 as a thrust bearing surface. The low friction material may be a fluorocarbon material configured to seal the chamber 20 and permit rotation of the rotor assembly 730.

In particular, the inner edge 734 of an outermost disk 732 at the first end of the rotor assembly 730 may be inserted into the first bracket 742. The first end of the rotor assembly 730 may include a fixed short stub shaft that may be either straight or tapered. The inner edge 734 of an outermost disk 732 at the second end of the rotor assembly 730 may be connected to the second bracket 744. The second bracket 744 may form a cradle that allows for alignment adjustment and securing of the rotor assembly 730. The brackets 742, 744 may come into contact to the walls of the housing 22 and/or to the shelf 746. The condensate manifold 54 may be secured to the first and second brackets 742, 744 using any suitable connection elements.

The drive assembly 710 may include a drive shaft 712, drive rollers 714 mounted around the drive shaft 712, and optional spacers 716 mounted around the drive shaft 712 between the drive rollers 714. The drive shaft 712 may be connected to a motor 705, such as an electric motor, disposed outside of the housing 22 and configured to rotate the drive assembly 710.

Rotation of the drive shaft 712 rotates the drive rollers 714, such that the drive rollers 714 rotate the rotor assembly 730. In particular, the drive rollers 714 may contact the contactors 740 or may contact the outer edges 736 of the disks 732 if no contactors 740 are present. In some embodiments, contact surfaces of the drive rollers 714 and the rotor assembly 730 may include gear teeth, friction pads, rubber belts or the like to prevent slippage during rotation.

The spacers 716 may be formed of a polymeric material and may be configured to separate the drive rollers 714 and/or align the drive rollers 714 and the disks 732. In some embodiments, the drive rollers 714 and the disks 732 may be self-aligning and the spacers 716 may be omitted. For example, the evaporator 700 may optionally include grooved drive rollers 714A and corresponding protruding contactors 740A, as shown in FIG. 7B. In particular, the contactors 740A may include triangular protrusions that fit into V-shaped grooves formed in the drive rollers 714A.

As shown in FIG. 7C, in some embodiments, the evaporator 700 may include idler rollers 718 configured to align the disks 732. For example, the idler rollers 718 may be non-driven pulleys designed to contact the outer circumferential surfaces 736 of the disks 732 and/or the contactors 740. In some embodiments, an idler roller 718 or a drive roller 714 may be disposed adjacent to the scoop 44 or a wiper (not shown) to prevent disk wobble and/or disk to scoop contact.

In addition, the evaporator 700 may include one or more vapor vanes 760 disposed between outer evaporator surfaces of one or more adjacent disks 732, as shown in FIG. 7D. The vapor vanes 760 may be mounted to the walls of the chamber 20. The vapor vanes 760 may be curved in order that vapor generated on the evaporation surfaces of the distillation elements 735 is directed and accelerated away from the vapor manifold 750 toward the outer circumferential edges 736 of the disks 732. For example, the vapor vanes 760 may be curved to in a direction of rotation R of the distillation elements 735. As such, vapor flow generated by the rotation of the distillation elements 735 first contacts an outer surface of the vapor vanes 760. In other words, the outer surface of the vapor vanes faces away from the direction of rotation R and an inner surface of the vapor vanes 760 faces the direction of rotation R.

The vapor vanes 760 may beneficially decrease pressure changes between adjacent chambers 20. For example, the vanes 760 may decrease a pressure drop in the chambers 20. For example, since this action behaves like a pump, there may be additional load on the rotor drive which will need to be compared against the benefit of reduced inter-effect pressure drop.

According to various embodiments, the drive force is transmitted from the drive assembly 710 directly to each of the disks 732. This direct drive configuration utilizes further parts and reduces power transmission stresses, as compared to previous designs that include an indirect drive system. There are no expensive rotor shafts, and no massive couplings which reduce mass, cost, and system energy requirement. The lubrication manifold is also eliminated from the embodiment design, so the possibility of clogged lubrication port is eliminated as well. Optionally, lubricant may be provided at rotor thrust ends, depending on bearing material specification. The loss of distillate into the previous effect's evaporator, as in the prior art, is eliminated because there is no fixed rotor shaft to provide a flow path into the previous evaporator.

Vapor is admitted from the compressor (or previous effect) through the wall (or inter-effect baffle), then into the open end of the rotor. A hose may be used to connect and seal between the wall and the rotor assembly 730 end bracket. This allows for easy removal of the rotor assembly 730. For example, the rotor assembly 730 may be removed by sliding the hose out of the way, disconnecting the condensate and optional lubrication hoses, removing bolts holding the rotor assembly 730 in place, and lifting up the rotor assembly 730.

Figures 8A, 8B:
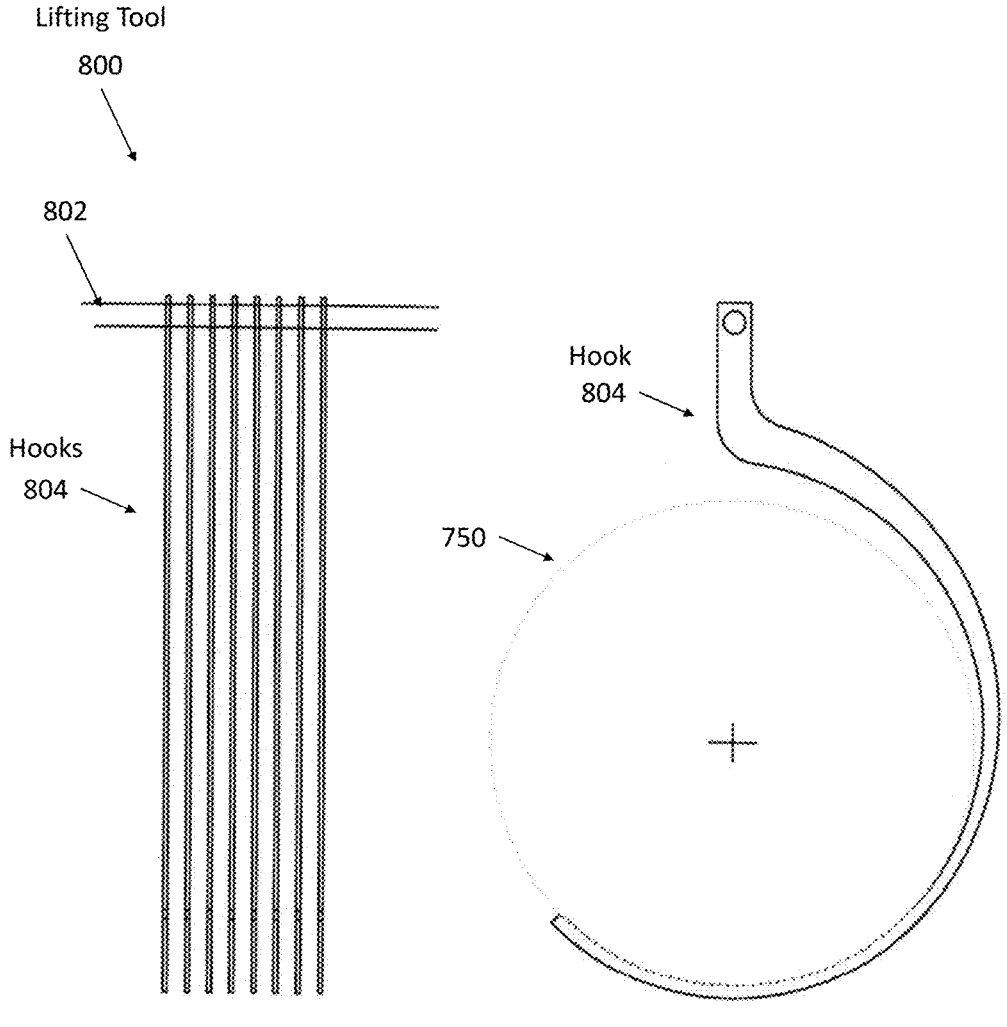
FIG. 8A is a side view of a lifting tool 800, according to various embodiments of the present disclosure.
FIG. 8B is a plan view of a lifting hook 804 of the embodiment lifting tool of FIG. 8A.

FIG. 8A is a side view of a lifting tool 800, according to various embodiments of the present disclosure. FIG. 8B is a plan view of a lifting hook 804 of FIG. 8A. Referring to FIGS. 7A, 8A, and 8B, the lifting tool 800 may include a support rod 802 and a number of lifting hooks 804 moveably attached to the support rod 802. The hooks 704 may be configured to support the rotor assembly 730 during removal and/or replacement of the rotor assembly 730 (see FIG. 7A). In particular, the hooks 804 may move relative to the support rod 802, in order to allow the hooks to be disposed between the distillation elements 735 and under the vapor manifold 750.

Figure 9:
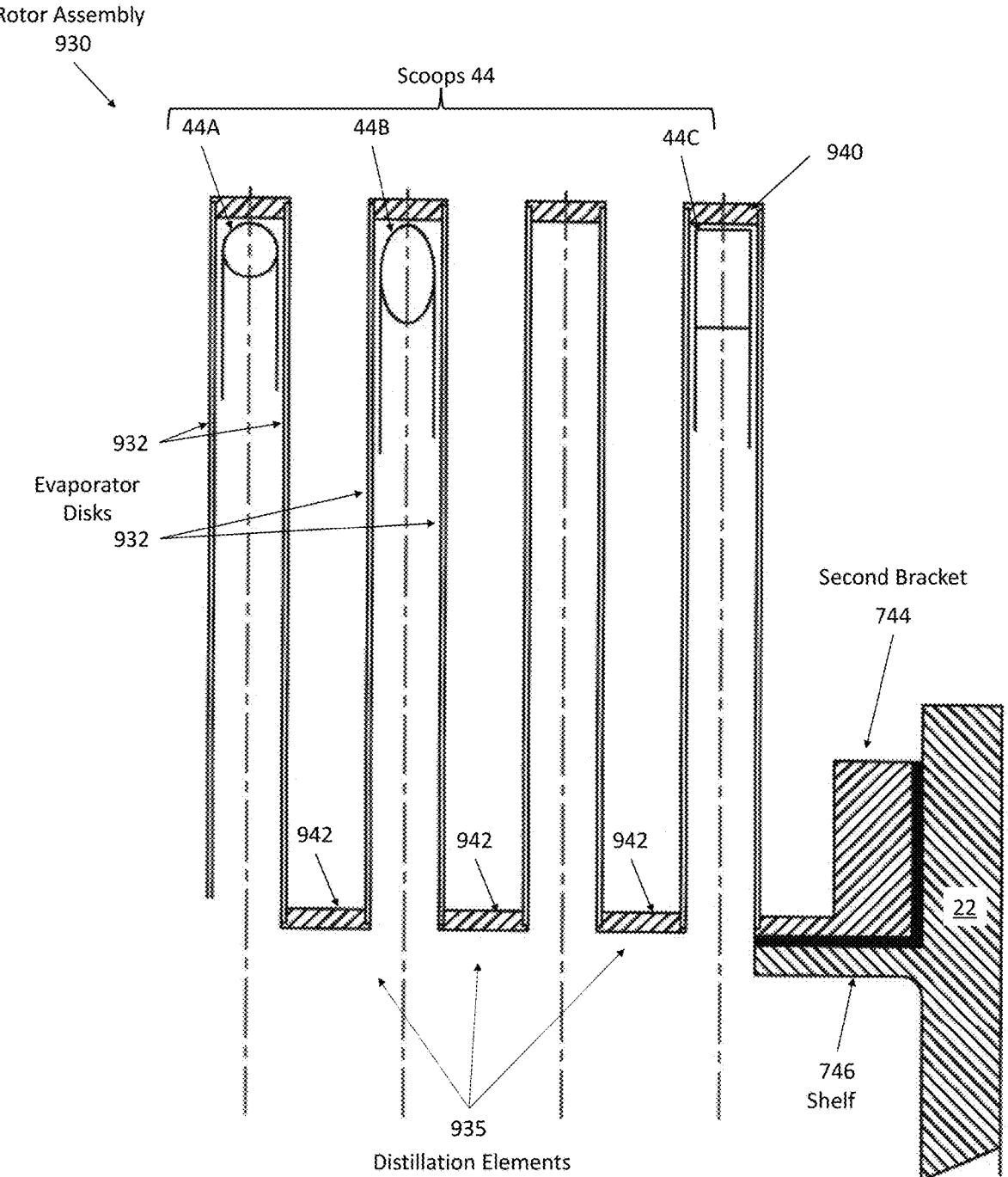
FIG. 9 is a partial cross-sectional view of an alternative rotor assembly 930, according to various embodiments of the present disclosure.

FIG. 9 is a partial cross-sectional view of an alternative rotor assembly 930, according to various embodiments of the present disclosure. Referring to FIG. 9, the rotor assembly 930 may include distillation elements 935 comprising pairs of substantially flat evaporator disks 932 connected by outer connectors 940 and inner connectors 942. The use of flat evaporator disks 932 may reduce manufacturing costs. For example, the disks 932 may be formed by laser or water jet cutting of a flat feed stock, followed by optional trimming.

The connectors 940, 942 may be polymer or metal rings and may be made from either a tube or pipe and parted to width, or can be made from an extrusion, and rolled into a circle and trimmed in a lathe. The scoops 44 may have different internal profiles to facilitate scooping of condensate. For example, scoop 44A has a circular internal surface profile, scoop 44B has an ovoid internal surface profile, and scoop 44C has a rectangular internal surface profile. In some embodiments, an ovoid or rectangular internal surface profile may be preferred to increase scooping efficiency.

Referring again to FIG. 7A, the wiper assemblies 108 generate the wiping action along with the centrifugal force from the rotating disks 732 that form the thin uniform liquid film (e.g., film 126 shown in FIG. 6, such as a distilland film or another liquid film). For an evaporator disk 732 wiped with a single wiper assembly 108, liquid refresh occurs once per disk 732 revolution. The liquid film thickness should be sufficient to prevent the complete evaporation of a wiped liquid prior to being refreshed, since complete evaporation may result in dry spots and/or scaling. Accordingly, in single wiper configurations, the thickness of deposited liquid film reduces a heat transfer coefficient, as compared to a thinner film.

Figure 10:
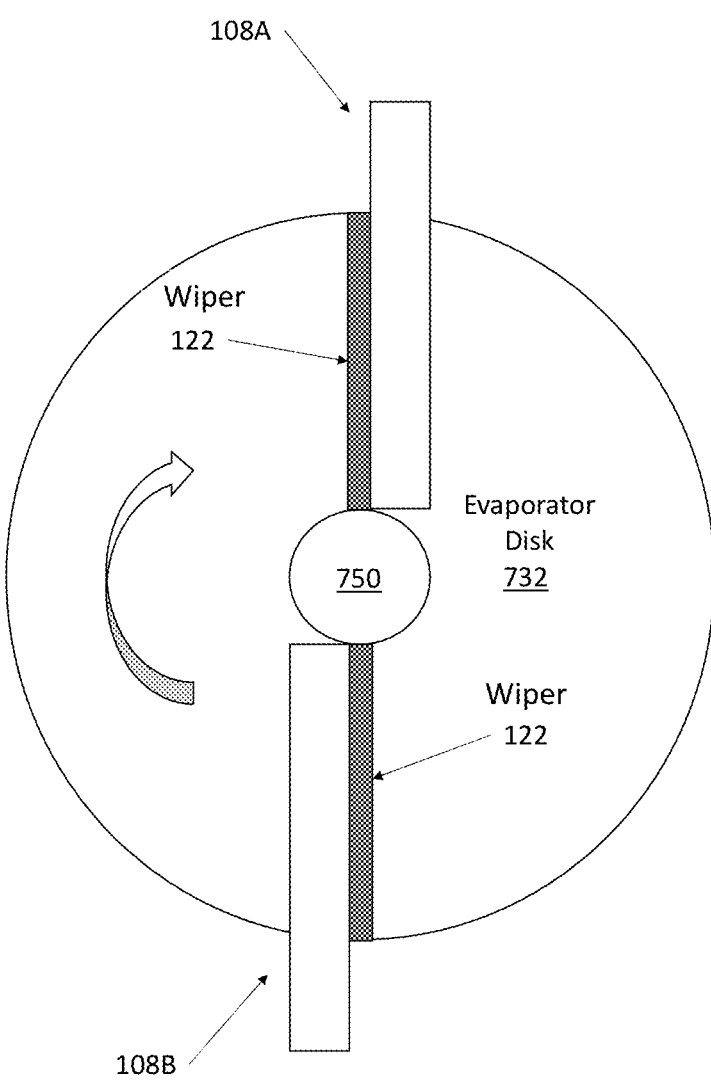
FIG. 10 is a plan view of an evaporator disk 732 and dual wiper assemblies 108 that may be used in the embodiment evaporator of FIG. 7A, according to various embodiments of the present disclosure.

FIG. 10 is a plan view of an evaporator disk 732 and plural wiper assemblies 108 that may be used in the evaporator of FIG. 7A, according to various embodiments of the present disclosure. Referring to FIGS. 7A and 10, dual wiper assemblies 108A, 108B are shown. A first wiper assembly 108A and a second wiper assembly 108B may be used to apply a liquid to the external surface of each evaporator disk 732, using corresponding wipers 122. However, in other embodiments, a single wiper assembly including two or more opposing wipers 122 may be utilized.

In particular, the present inventor discovered that utilizing multiple wiper assemblies 180 and/or wipers 122 to apply a liquid film to the disks 732, the overall thickness of the film may be reduced, thereby improving heat transfer. In particular, two wipers 122 may refresh an applied film every half revolution, when the wipers are 180° diametrically opposed on the disk 732. As a result, a thinner film thickness can be applied and maintained without the risk of drying out or scale formation. In other embodiments, three, four, or more wiper assemblies can be used to apply a liquid film to a disk 732. For examples, three wipers arranged at an angle of 120° from one another may also be utilized.

A multi-wiper configuration may be particularly useful for large diameter disks. The ratio of wiper length (single wiper) to wiped length (circumference at mid-wiper) is shown in the following Table 1. The ratio of disk area to wiper length is also shown.

TABLE 1

| Nominal Disk Diameter, in. | 16 | 24 | 36 | 48 |
|---|---|---|---|---|
| Wiper Length, L, in. | 6.5 | 7.4 | 10.0 | 12.1 |
| Disk Area, A, ft$^2$ | 1.34 | 2.23 | 4.8 | 8.7 |
| Mid-wiper circumference, C, in | 30 | 44 | 75 | 107 |
| Ratio, C/L, in./in. | 4.6 | 5.9 | 7.5 | 8.8 |
| Ratio, A/L, ft$^2$/in | 0.21 | 0.30 | 0.48 | 0.72 |

Table 1 shows that as the disk area increases, the circumferential length (and area) between liquid refresh also increases. In embodiments including the 48" diameter disks, at least two wipers per disk may be used. For example, using four wipers per 48" disk would even further reduce the area per wiper length to an area slightly less than that of the 16" disk.

Using a flat circular disk shape (e.g., donut shape) would be an easier and lower manufacturing cost of the disks. This requires only that flat sheet stock be laser or water jet cut and trimmed. The rings can be made from either a tube or pipe and parted to width, or they can be made from an extrusion, and rolled into a circle and trimmed in a lathe. The disks 732 may also be fabricated in a variety of shapes using 3-D printing techniques. The evaporator side of the disk 732 may smoothed by a secondary machining step. The advantage of 3-D fabrication is that disks 732 having a higher condenser-side surface area resulting from a rough surface finish, such that with a sufficient surface area increase, there should be a benefit to heat transfer performance.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A rotating evaporator, comprising;
a housing comprising a chamber;
a rotor assembly disposed in the chamber and comprising:
 distillation elements that each comprise an internal cavity, condensation surfaces that face the internal cavity, and evaporation surfaces that face away from the internal cavity; and
 a vapor manifold extending through the distillation elements and configured to provide a vapor to the internal cavities;
wiper assemblies configured to form a liquid film on the evaporation surfaces;
condensate scoops located in the respective inner cavities of the distillation elements and configured to collect a condensate from the condensation surfaces;
a condensate manifold extending through the vapor manifold and configured to receive the condensate from the condensate scoops; and
a drive assembly configured to rotate the rotor assembly, the drive assembly comprising:
 a drive shaft; and
 drive rollers disposed on the drive shaft and contacting outer circumferential contact surfaces of the distillation elements;

wherein:
 each distillation element comprises a pair of annular evaporator disks, each evaporator disk comprising an outer circumferential edge, an inner circumferential edge, the condensation surface, and the evaporation surface;
 the outer circumferential edges of each pair of evaporator disks are connected to form the outer circumferential contact surfaces; and
 the inner circumferential edges of the evaporator disks of adjacent distillation elements are connected to form the vapor manifold.

2. The rotating evaporator of claim 1, wherein the rotor assembly comprises contactors that connect the outer circumferential edges of each pair of evaporator disks and form the outer circumferential contact surfaces of the distillation elements.

3. The rotating evaporator of claim 2, wherein:
the contactors comprise protrusions; and
the drive rollers comprise recesses configured to mate with the protrusions.

4. The rotating evaporator of claim 1, wherein:
the outer circumferential edges of each pair of evaporator disks are inwardly bent to form first flanges, and the first flanges of each pair of evaporator disks are connected to form the outer circumferential contact surfaces; and
the inner circumferential edges of each pair of evaporator disks are outwardly bent to form second flanges, and the second flanges of the evaporator disks of adjacent distillation elements are connected to form the vapor manifold.

5. The rotating evaporator of claim 1, further comprising spacers disposed on the drive shaft and configured to separate the drive rollers.

6. The rotating evaporator of claim 1, further comprising:
a first bracket comprising bearings and disposed on a first side of the chamber; and
a second bracket comprising bearings and disposed on a second side of the chamber,
wherein a first end of the rotor assembly is supported by the first bracket and a second end of the rotor assembly is supported by the second bracket.

7. The rotating evaporator of claim 6, wherein the chamber further comprises a shelf that supports the second bracket.

8. The rotating evaporator of claim 1, further comprising vapor vanes disposed between at least two of the distillation elements and configured to accelerate a vapor generated on the evaporation surfaces of the distillation elements away from the vapor manifold.

9. The rotating evaporator of claim 8, wherein the vapor vanes are curved in a direction of rotation of the distillation elements.

10. The rotating evaporator of claim 1, wherein the wiper assemblies each comprise at least two wipers that contact each of the evaporation surfaces.

11. The rotating evaporator of claim 1, wherein the wiper assemblies each comprise at least three wipers that contact each of the evaporation surfaces.

12. The rotating evaporator of claim 1, further comprising idler rollers.

13. The rotating evaporator of claim 12, wherein the idler rollers are configured to contact the outer circumferential contact surfaces and maintain an alignment of the distillation elements.

14. The rotating evaporator of claim 13, wherein at least two of the idler rollers are provided for each distillation element.

15. The rotating evaporator of claim 1, further comprising a lifting tool configured to remove the rotor assembly from the chamber, the lifting tool comprising:

a support rod; and lifting hooks moveably attached to the support rod and configured to support an outer surface of the vapor manifold.

16. The rotating evaporator of claim 1, wherein the chamber further comprises a reservoir configured to contain a feed solution.

17. The rotating evaporator of claim 1, wherein the housing comprises multiple fluidly connected chambers, and each chamber comprises the rotor assembly, the wiper assemblies, and the drive assembly.

18. The rotating evaporator of claim 1, further comprising a motor connected to the drive shaft.

19. A method of operating the rotating evaporator of claim 1, comprising:

rotating the drive rollers which rotate the rotor assembly by contacting the outer circumferential contact surfaces of the distillation elements;

providing the vapor to the internal cavities from the vapor manifold;

condensing the vapor on the condensation surfaces in the internal cavities to form a condensate;

collecting the condensate from the condensation surfaces using the condensate scoops;

providing the condensate from the condensate scoops into the condensate manifold;

forming a liquid film on the evaporation surfaces using the wiper assemblies; and evaporating the liquid film on the evaporation surfaces using heat from the vapor condensing the vapor on the condensation surfaces.

\* \* \* \* \*